March 10, 1931.  A. SALA  1,795,798
DEMOUNTABLE PNEUMATIC TIRE CONSTRUCTION
Filed Oct. 30, 1930  2 Sheets-Sheet 1

Inventor
Adrian Sala
By Clarence A. O'Brien
Attorney

Patented Mar. 10, 1931

1,795,798

UNITED STATES PATENT OFFICE

ADRIAN SALA, OF NEWARK, NEW JERSEY, ASSIGNOR OF ONE-HALF TO JOHN RINALDI, OF NEWARK, NEW JERSEY

DEMOUNTABLE-PNEUMATIC-TIRE CONSTRUCTION

Application filed October 30, 1930. Serial No. 492,272.

This invention relates to certain structural improvements and refinements embodied in a pneumatic tire assembly of the demountable variety.

More explicitly related, the inventive conception comprehends a combination sectional tire and an associated sectional tire rim, making up a complete demountable unit susceptible of practical usage on present-day vehicle wire wheels of the type including clencher flanges and a centralized well.

In carrying the invention into practice, I have developed a structural assembly of details characterized by simplicity and economy, due to the fact that the individual or sectional parts are capable of individual replacement or repair.

Figure 1:
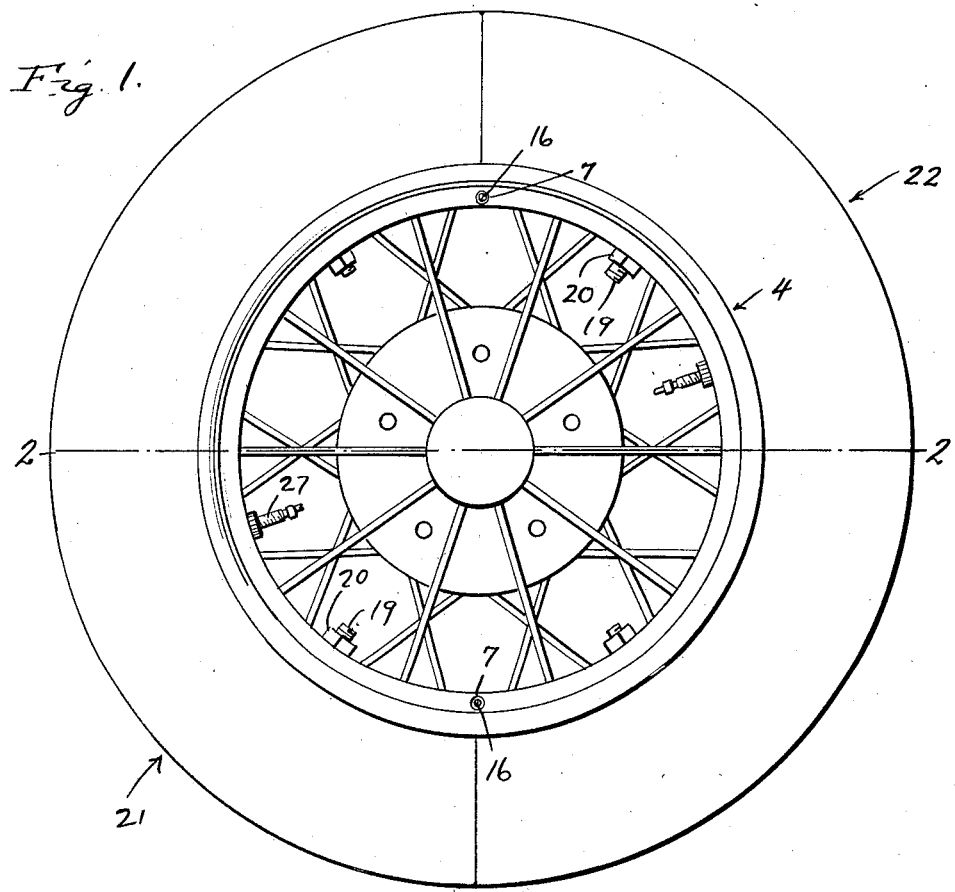
Figure 1 is a side elevational view of a tire mounted on a wire wheel.

In the drawings, the numeral 4 designates a conventional wire wheel having the clencher type wheel rim 5 and the central annular channel or well 6. In accordance with the present invention, the well is provided at diametrically opposite points with access holes 7 which function in a manner to be hereinafter described.

In addition, at circumferentially spaced points are retaining bolt holes which act in a manner hereinafter made plain.

Figure 2:
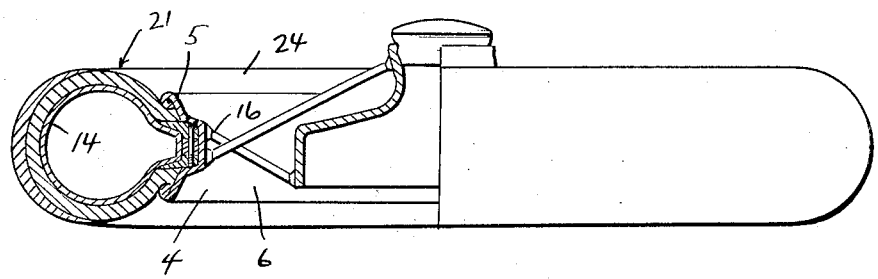
Figure 2 is a horizontal section on the line 2—2 of Figure 1.
Figure 3:
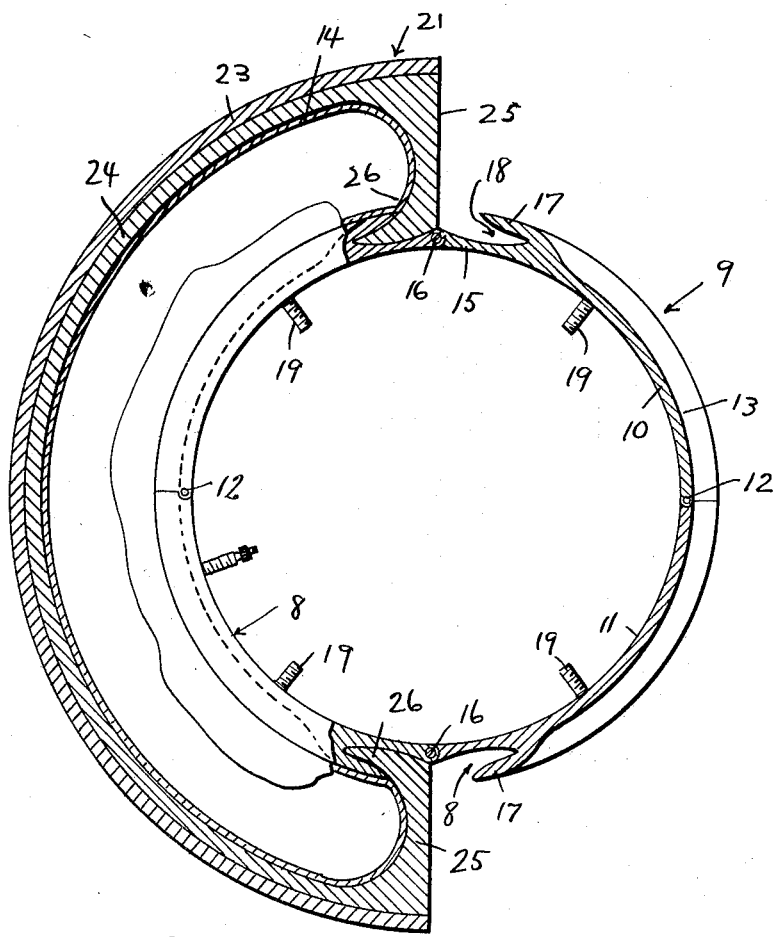
Figure 3 is a view in section and elevation showing one of the tire sections on the complete tire rim, portions of the rim being shown in section.

The improved tire rim as depicted in Figure 3 may be said to embody a pair of duplicate half sections 8 and 9 respectively. Each section itself is made up of quarter-complemental sections 10 and 11 respectively which are hingedly connected together at 12. These sections 10 and 11 are provided with channels 13 for reception of a portion of the inner tube 14 as shown in Figure 2.

The terminals 15 of the respective half sections 8 and 9 are fashioned to accommodate a removable connecting bolt or screw 16 whose kerf end or head is accessible through the aforesaid sight openings in the wheel rim as shown in Figures 1 and 2.

In addition to the extensions 15, I provide relatively short projections 17 which are so shaped and formed as to define keeper seats 18. Each of the sections 10 and 11 are provided with retaining studs 19 which pass through circumferentially spaced holes in the well 6 of the wheel rim and are held in place by retaining nuts 20 as shown in Figure 1.

Incidently, this tire rim 9 is so proportioned as to permit it to be seated nicely in the well portion 6 of the wheel rim.

The tire proper is composed of a pair of complemental half sections distinguished by the numerals 21 and 22 respectively. Each section comprises a suitable tread 23 and a casing or body portion 24. In this instance, it will be observed that the body portion 24 is provided with closed ends 25 each of which has a substantially V-shaped retaining tongue or extension 26 shaped to be received in the complemental keeper seat 18, as shown in Figure 3.

Thus, when the casing is assembled on the tire rim 9, the closed end walls 25 of the respective sections 21 and 22 come together in tight abutting relationship. The inner tubes for these respective sections are provided with individual inflation valves 27.

Assuming that it is desired to change the tire from the wheel as shown in Figure 1, the first step is to insert a screw driver into the hole 7 and to remove the connecting bolts 16. This allows the tire sections 21 and 22 and their respective rim sections 8 and 9 to be bodily removed.

Before these sections can be removed however, it is obvious that it is necessary to unscrew the retaining nut 20 from the stud 19. With this arrangement, it is obvious that either one or both of the sections 21 or 22 may be removed for repair. As a matter of fact, it is seldom necessary to remove both sections for a puncture is likely to occur but in a single section at a time.

After the section is removed, it is permissible to detach the tire rim therefrom by collapsing the sectors 10 and 11 on the hinge joints 12. Then the inner tube can be removed for repair, and replaced, and the tongues 26 of the casing 24 snapped back into the complemental keeper seat 18.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. A pneumatic tire construction of the class described, comprising, in combination, a tire rim embodying a pair of complemental semi-circular half sections and means for attaching said sections detachably together, each section being composed of a pair of hingedly connected companion portions, provided with wheel rim retaining means, and a pair of individual semi-circular tire units each including an independent inner tube having an inflation valve, and an associated protective casing, the meeting ends of the casing of the respective units being closed and in abutting relationship, and co-acting means between said ends and adjacent portion of said tire rim for holding the units removably in place on the rim.

2. A pneumatic tire construction of the class described, comprising, in combination, a tire rim embodying a pair of complemental semi-circular half sections and means for attaching said sections detachably together, each section being composed of a pair of hingedly connected companion portions, provided with wheel rim retaining means, and a pair of individual semi-circular tire units each including an independent inner tube having an inflation valve, and an associated protective casing, the meeting ends of the casing of the respective units being closed and in abutting relationship, and co-acting means between said ends and adjacent portion of said tire rim for holding the units removably in place on the rim, said tire rim being of a cross sectional shape and of such proportion as to permit it to be fitted telescopically in a conventional well in the rim of a wire wheel construction.

3. In a structure of the class described, in combination, a wire wheel including a rim having clencher flanges and a centralized well provided with circumferentially spaced bolt holes and a pair of diametrically opposite access openings, a demountable tire including a tire rim and separable tire sections, said tire rim comprising detachably connected half sections, joined together through the medium of connecting bolts, said bolts being accessible through said wheel rim openings, and the portions of said tire rim being provided with screw-threaded studs for projection through the circumferentially spaced holes in the well portion of said wheel rim, whereby to accommodate retaining nuts.

4. As a new product of manufacture, a tire rim comprising a pair of complemental half sections, each half section including hingedly connected companion sectors, the adjacent ends of said half sections being detachably fastened together and provided adjacent said detachable ends with projections defining keeper seats.

5. As a new product of manufacture, a tire rim comprising a pair of complemental half sections, each half section including hingedly connected companion sectors, the adjacent ends of said half sections being detachably fastened together and provided adjacent said detachable ends with projections defining keeper seats, and a two-part pneumatic tire including casings having closed ends provided with lateral projecting retaining tongues adapted for removable reception in said keeper seats.

In testimony whereof I affix my signature.

ADRIAN SALA.